Patented July 30, 1940

2,209,530

UNITED STATES PATENT OFFICE 2,209,530

METHOD OF COATING AND DECORATING METALS

Martin W. Mason, Nutley, N. J., assignor to Pittsburgh Plate Glass Company, Allegheny County, Pa., a corporation of Pennsylvania No Drawing. Application October 22, 1937, Serial No. 170,358

6 Claims. (Cl. 41—33)

The present invention relates to the application of decorative and protective films to metals such as iron, steel, zinc, and the like, or to alloys thereof, and it has particular relation to the coating of such materials with reactive resins, notably vinyl resins of the type obtained by polymerization of a mixture of vinyl acetate and vinyl chloride.

One object of the invention is to provide a simple and convenient method of applying chemically resistant, protective and decorative coatings containing vinyl chloride, or a co-polymer of vinyl chloride and vinyl acetate to iron, steel, zinc and the like.

A second object of the invention is to provide relatively permanent and highly resistant coatings for iron and steel which do not blacken or decolorize upon heat aging.

These and other objects will be apparent from consideration of the following specification and the appended claims.

A common method of decorating such metals as iron, steel, or alloys thereof comprises the application of a film-forming material such as nitrocellulose or a drying oil as a liquid which is allowed to dry by evaporation or by chemical change to form a film. It has also been proposed to coat the metals with decorative and protective films which were preformed in any convenient manner to simulate marble or to carry some other design, and which after superposition upon the surface of the metal were caused to adhere thereto by application of heat and pressure. Sometimes these preformed films were applied to a suitable backing such as a dextrin coated paper by making up the film-forming constituent into a printing ink and then applying one or more coatings of this ink to the paper by means of a suitable printing press. By application of such process it was possible to form unlimited quantities of decalcomania or transfer sheets which constituted excellent simulations of marbles, rare woods, or any other decorative subject which it might be desirable to imitate. After these were applied to the metal, for example by heat and pressure, they were soaked in water and the paper backing stripped off.

Unfortunately in the processes as heretofore developed nitrocellulose or drying oils were customarily employed as the film-forming ingredients. The thermoplasticity or capacity to soften under heat and pressure in such films was never very great and upon aging it rapidly diminished so that adhesion of the films to the base metal was sometimes difficult to obtain. The films upon aging also become progressively more and more brittle so that upon any flexure of the metal, checking and breaking frequently occur. The films for many purposes were further objectionable because their resistance thereof to the effects of various solvents and chemical agents was very low.

For a number of years certain synthetic resins, notably those consisting of a polymer of vinyl chloride or containing vinyl chloride in combination with other vinyl resin, such as vinyl acetate, have been available upon the market. These resins in some respects are remarkably free from the defects heretofore encountered in preparation of transfer or decalcomania films for the decoration of iron or steel. For example, the resins are relatively insoluble in most organic solvents such as alcohol with which the resins are likely to contact and are also resistant to most chemical agencies. Furthermore, the films are quite thermoplastic and upon application of heat and pressure thereto very close contact between the films and the metal to which they are applied is readily obtained.

However, these resins obtained from or containing polymerized vinyl chloride are not inherently suitable for use in the preparation of decalcomania films for the coating of such metals as iron and steel, because when the metal contacts with the resin under elevated temperature some form of chemical or physical action occurs. As a result the resins are blackened and the bond between the metal and the film is quickly weakened or destroyed.

According to the provisions of the present invention, decalcomania sheets are formed of suitably colored vinyl resins and the defects heretofore encountered are overcome by preliminary treatment of the metal or by incorporation into the films of a material which in some way has the capacity for retarding or preventing the chemical or physical change which usually occurs in resins derived from vinyl chloride upon contact with iron or steel.

Films in the form of decalcomania sheets suitable for use in practicing the present invention may be prepared by various methods. Probably the most satisfactory of these methods for use where simulations of marble, rare woods, or the like are to be prepared involves simple printing by lithographic or by rotogravure process, or other common process with an ink containing any desired resin as a film-forming constituent upon a paper backing. Various vinyl chloride resins may be employed in the preparation of the inks, but a co-polymer of vinyl acetate in the ratio of about 15 to 13 per cent and vinyl chloride in the ratio of about 85 to 87 per cent is quite satisfactory.

The vinyl resin may, also, be combined with suitable proportions (e. g. 5 to 30 per cent upon the basis of vinyl resin, more or less) of various plasticizers including dibutyl phthalate, diamyl phthalate, the ester of the mono-butyl ether of ethylene glycol and phthalic acid, tricresyl phosphate, castor oil, chlorinated diphenyls known as arochlors, and other conventional plasticizers or modifying resins, as well as combinations of any two or more of the foregoing, or other plasticizers. An excellent ink suitable for forming the transfers by rotogravure printing is obtained by combining about 100 parts by weight of titanium dioxide with 100 parts of the co-polymer of 85 to 87 per cent of vinyl chloride and 15 to 13 per cent of vinyl acetate and about 12½ parts of diamyl phthalate. These ingredients are dissolved or suspended in a suitable solvent in proportions sufficient to give the desired consistency for printing operations. An excellent solvent may be obtained by the combination of equal parts of acetone or ketone such as ethyl methyl ketone, dipropyl ketone and a diluent such as toluene. Colors and pigments include titanium dioxide or the like and may be used in any convenient amount, e. g. 25 to 45 per cent of the resin binder. The proportion above given is exemplary.

The number of applications of ink required are dictated by the requisites as to thickness and design of the film. Where the background of film is formed upon or by the base to which it is applied, the film may, if desired, be discontinuous. Even where the films are continuous, there will usually be variations as to thickness in different regions thereof. Films may also be formed by other methods of printing or if the nature of the design carried by the film admits, by calendering, extruding, etc.

The backing sheet may comprise a single ply of paper having a coating of dextrin or the like next to the vinylite film. However, if preferred, composite backing sheets consisting of two or more plies of paper may be employed. Thus a sheet of rice paper of medium weight may be cemented to a heavy sheet by means of dextrin or other soluble cementing material. The lighter sheet is then given an exterior coating of dextrin upon which the design is printed by means of vinylite ink. When a decalcomania sheet having such composite backing is applied to an object and the necessary bond obtained, the heavy sheet is stripped away first. The lighter sheet permits rapid strippage of the heavier sheet, lessening the danger of film marring. The light flexible paper next to the film may be stripped away after removal of the heavy sheet with but little danger to the latter. A top coat of vinyl co-polymer resin in a solvent may be sprayed upon the film and dried.

Preliminary treatment of the metal may involve application of a priming or surfacing coating which will prevent contact between the metal and the transfer film and at the same time will provide an opaque or suitably tinted ground. "Short" varnishes are examples of such. It may also involve coating with a varnish containing stabilized vinyl acetate- vinyl chloride co-polymer. Such stabilization may be effected by incorporation of blue lead or a small amount of phosphoric acid or a soluble phosphate. Probably most satisfactory results are attained by preliminary phosphatization of the metal.

In order to apply transfer films to bodies of ferruginous metal such as ordinary sheet iron or steel, or alloys thereof, which may be employed in fabricating furniture, wall panelling, automobile window reveals, etc., the iron is first carefully cleaned as if it were to be coated in a conventional manner. The metal may then receive one or more coats of a varnish such as "short" varnish employed to coat beer cans. Transfers may be applied directly to this varnish by application of temperatures (say 200 or 400° F.) and pressure sufficient to produce good contact between the resin and metal. However, the metal may first be coated with one or more coatings of a varnish containing a co-polymer of vinyl acetate and vinyl chloride. This coating then receives the transfers. Application may be preceded by drying and baking, followed by application of the transfer film under heat and pressure. It is, also possible to apply the film while cold to the freshly varnished surface. In the latter case application may be followed by drying and baking at 200–400° F. Alternatively the surface of the metal may be coated with a varnish containing vinyl acetate-vinyl chloride-co-polymer, with blue lead in sufficient amount to act as a stabilizer. This coat may then receive the transfer or the latter may receive one or more further coats of suitably tinted or pigmented varnish of similar nature but with reduced amounts of, or with no, blue lead.

Undercoatings of co-polymer varnishes may be stabilized so that they will adhere to metal and retain transfers with a fair degree of permanence by simply adding to the varnish a small amount (0.1% on the basis of resin) of phosphoric acid or a soluble phosphate. The transfer of the film is then effected by application of heat and pressure or by application of the film to the wet varnish followed by drying and baking.

A variation of such process might involve incorporation of the stabilizer into the ink from which the transfer film is fabricated. The latter might then be caused directly to adhere to the metal. If the transfer receives an undercoating, prior to application, the phosphoric acid may be incorporated into it. Any of these various undercoatings may be suitably opacified and tinted by means of pigments such as titanium dioxide.

Probably the most satisfactory process of obtaining stability of the transfer films involves directly phosphatizing the metal itself. Numerous methods of accomplishing this object are available but an excellent one involves subjecting metal such as sheet iron in a solution of a soluble phosphate to an alternating current of electricity. Details of such process are described in British Patent 435,773. The treated metal may be washed, dried and then receive one or more coatings of a varnish containing vinyl acetate-vinyl chloride co-polymer. Such varnish may contain about 25–60 parts of resin, a pigment such as titanium dioxide alone or admixed with calcium sulfate (40–75 parts), and sufficient solvent such as acetone, dipropyl ketone, ethylene dichloride alone or admixed with diluent such as toluene to give adequate fluidity for application. Plasticizers such as diamyl phthalate in suitable amount e. g. 10–40% on the basis of resin content may also be added. The film is then dried. It may be preliminarily baked at a temperature of 200–400° F. for a short time (2 to 8 minutes more or less) to eliminate solvents and to cause the resin to flow and adhere to the metal. Just prior to application of the transfer film the surface may be moistened with a solvent. To promote adhesion transfer film may receive a preliminary spray coating or backing coat of vinyl acetate-vinyl chloride co-polymer varnish, which may be dried prior to application of the film. To apply the film it is simply placed upon the coated metal with the paper backing outermost. The assembly is then placed in a press heated to a temperature of the order of 200–400° F. and the films then caused completely to weld together by a pressure of suitable intensity (e. g. 75 pounds per square inch or more). No definite time limit need be placed upon the pressing operation, but 2 or 3 minutes will usually suffice. The coated object is then removed from the press and the paper backing or backings stripped off. The latter operation may be preceded by soaking with water in order to soften the soluble gum. Finally, the residual gum is washed away and one or more coats of varnish are subsequently applied to protect the decorative film. The steps of removing the paper backing and then coating with a protective varnish are essentially the same regardless of the mode of application of the film. The double paper backing makes for greater ease in the stripping operation, but it is not essential to it. A singe ply of paper may be employed if preferred.

A still further method of treating the metal in order to make it receptive to vinyl acetate-vinyl chloride films involves treating it with a solution of chromic acid or a soluble chromate containing an activator such as sodium chloride, sodium cyanide or the like. Details of processes of this type are discussed in Canadian Patent 357,-584. Application of transfers to metal so treated follows the lines discussed in connection with phosphatic treatment and may include direct application of the transfer film to the treated metal or application to metal which has received a preliminary coating of vinyl acetate-vinyl chloride co-polymer resin.

The application of the decalcomania to iron and steel has been particularly stressed, because it provides an excellent method of applying films of reactive vinyl resins thereto. However, the films may also be applied to zinc, brass, aluminum or other metals by appropriate methods.

The invention has been described with particular emphasis upon decalcomania films in suitable tints and colors prepared by printing upon paper which has been preliminarily coated with a water soluble gum. However, it is also possible to form sheets by simple rolling or extrusion, which may be applied directly to metal without preliminary use of a paper backing. The range and character of the designs possible in such process are of necessity more limited than may be obtained by printing.

By use of applicant's process it is possible to produce in perfect duplication designs either new or simulating other materials, in great quantities. The sheets carrying the designs may be applied to metal with ease and will adhere with great tenacity for long periods of time without decomposition or discoloration. Such films are highly resistant to most acid and alkaline substances and provide perfect protection for the metal.

The embodiments of the invention herein disclosed are merely exemplary. Numerous modifications may be made without departure from the spirit of the invention or the scope of the appended claims.

What I claim is:

1. A process of coating bodies of ferruginous metal which comprises phosphatizing the surface of the body and then applying a preformed film of a resin consisting of a co-polymer of vinyl acetate and vinyl chloride upon a backing of paper and stripping off the backing.

2. A process as defined in claim 1 in which the film is caused to adhere by application of heat and pressure.

3. A process of coating bodies of ferruginous metal which comprises applying to the surface to be coated a phosphatizing treatment, subsequently coating the surface with a varnish containing as a film-forming ingredient a co-polymer of vinyl acetate and vinyl chloride, then applying to the coated surface a preformed transfer film containing vinyl acetate-vinyl chloride co-polymer resin upon a backing of paper and stripping off the backing.

4. A decalcomania sheet embodying a film of vinyl resin containing a co-polymer of vinyl chloride and vinyl acetate upon a backing of paper having an intermediate coating of a water soluble gum, said film containing blue lead for rendering the resin nonreactive with respect to iron or steel.

5. A method of coating bodies composed of ferruginous metal which comprises phosphatizing the surface of the metal and then applying thereto a film of resin containing polymerized vinyl chloride secured upon a backing of paper by a temporary cement, stripping away the backing and baking the film.

6. A process as defined in claim 5 in which the phosphatization involves electrolytic deposition of a phosphate.

MARTIN W. MASON.